US011971915B2

(12) United States Patent
Ogura et al.

(10) Patent No.: US 11,971,915 B2
(45) Date of Patent: Apr. 30, 2024

(54) LANGUAGE PROCESSOR, LANGUAGE PROCESSING METHOD AND LANGUAGE PROCESSING PROGRAM

(71) Applicant: NIPPON TELEGRAPH AND TELEPHONE CORPORATION, Tokyo (JP)

(72) Inventors: Tsuyoshi Ogura, Musashino (JP); Masanori Ogawara, Musashino (JP); Takahiro Yamaguchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 326 days.

(21) Appl. No.: 17/619,596

(22) PCT Filed: Jun. 18, 2019

(86) PCT No.: PCT/JP2019/024003
§ 371 (c)(1),
(2) Date: Dec. 16, 2021

(87) PCT Pub. No.: WO2020/255234
PCT Pub. Date: Dec. 24, 2020

(65) Prior Publication Data
US 2022/0382790 A1  Dec. 1, 2022

(51) Int. Cl.
*G06F 16/332* (2019.01)
*G06F 16/31* (2019.01)
*G06F 16/33* (2019.01)
*G10L 15/19* (2013.01)

(52) U.S. Cl.
CPC ........ *G06F 16/3329* (2019.01); *G06F 16/313* (2019.01); *G06F 16/3344* (2019.01); *G10L 15/19* (2013.01)

(58) Field of Classification Search
CPC .............. G06F 16/3329; G06F 16/313; G06F 16/3344; G10L 15/19
See application file for complete search history.

(56) References Cited

U.S. PATENT DOCUMENTS

2017/0162190 A1*  6/2017  Wakaki .................. G10L 13/00

OTHER PUBLICATIONS

Sadao Kurohashi, Natural language processing, The Open University of Japan Teaching Materials 1570153-1-1511, Mar. 20, 2015.
(Continued)

*Primary Examiner* — Sonia L Gay
(74) *Attorney, Agent, or Firm* — Harness, Dickey & Pierce, P.L.C.

(57) ABSTRACT

The present disclosure is directed to enabling acquisition of information of an argument corresponding to a case. The present disclosure is a language processing apparatus which refers to an argument emergence history database 14 which stores argument emergence patterns associated with cases and arguments of verbs for each meaning of a word or usage of a verb, acquires an argument emergence pattern which matches a verb and a case of the verb included in a request from a user from the argument emergence history database 14, and generates a response to the user using an argument included in the argument emergence pattern acquired from the argument emergence history database 14.

7 Claims, 8 Drawing Sheets

(56) References Cited

OTHER PUBLICATIONS

Manabu Okumura, Introduction to Natural Language Processing, Corona Publishing Co.,Ltd., Oct. 28, 2010.
Tomomasa Furukawa et al., Generation of utterance candidates for ambiguity using case grammar for user utterances, The 24th Annual Meeting of the Association for Natural Language Processing, Mar. 2018, pp. 905-908.

* cited by examiner

[3]

ARGUMENT EMERGENCE HISTORY BASED ON CASE FRAME

| | CASE 1 (ga CASE) | CASE 2 (wo CASE) | CASE 3 (ni CASE) | CASE 4 (de CASE) | CASE 5 (no CASE) | CASE 6 (TIME) | CASE 7 (MODIFICATION) | ... | CASE $n_A$ | SPEAKER ID | THE NUMBER OF TIMES OF EMERGENCE |
|---|---|---|---|---|---|---|---|---|---|---|---|
| ARGUMENT EMERGENCE PATTERN 1 | T1(1) | T1(2) | T1(3) | T1(4) | T1(5) | T1(6) | T1(7) | | T1(nA) | U1 | C1 |
| ARGUMENT EMERGENCE PATTERN 2 | T2(1) | T2(2) | T2(3) | T2(4) | T2(5) | T2(6) | T2(7) | | T2(nA) | U2 | C2 |
| ARGUMENT | T3(1) | T3(2) | T3(3) | T3(4) | T3(5) | T3(6) | T3(7) | | T3(nA) | U3 | C3 |
| | T4(1) | T4(2) | T4(3) | T4(4) | T4(5) | T4(6) | T4(7) | | T4(nA) | U4 | C4 |
| | T5(1) | T5(2) | T5(3) | T5(4) | T5(5) | T5(6) | T5(7) | | T5(nA) | U5 | C5 |

USAGE 1, USAGE 2

VERB
  ORDER

DESIGNATION OF CONDITIONS OF CASE
  wo CASE/NOTEBOOK

DESIGNATION OF SPEAKER
  NO

OUTPUT TARGET CASE
  MODIFIER EXPRESSING
  QUANTITY

[7]

DESIGNATED CONDITIONS

VERB: ORDER
CASE: wo CASE/NOTEBOOK
OUTPUT: MODIFIER
EXPRESSING QUANTITY
SPEAKER: NO DESIGNATION

SEARCH RESULT

LANGUAGE PROCESSOR, LANGUAGE PROCESSING METHOD AND LANGUAGE PROCESSING PROGRAM

CROSS-REFERENCE TO RELATED APPLICATIONS

This application is a 371 U.S. National Phase of International Application No. PCT/JP2019/024003 filed on Jun. 18, 2019. The entire disclosures of the above applications are incorporated herein by reference.

TECHNICAL FIELD

The present invention relates to a natural language processing technique using a computer.

BACKGROUND ART

In semantic understanding of a sentence in natural language by a computer, predicate argument structure analysis which analyzes relationship between a predicate and a noun (argument) which co-occurs around the predicate while placing meaning of the predicate such as a verb and an adjective at the center of meaning (excerpt from explanation on page 107 of Non-Patent Literature 1) is important processing. Words constituting a sentence in natural language are related to each other in the sentence, and this relationship between words in the sentence will be referred to as a case (excerpt from explanation on page 71 of Non-Patent Literature 2). Predicate argument structure analysis is processing of analyzing a role as a case performed by each argument which co-occurs around a predicate verb, with respect to the verb. Further, information which plays an important role when such processing is performed at the computer is a case frame.

The case frame describes information as to what kind of case is used when an inflectable word (particularly, a verb) in certain language becomes a predicate, and what kind of noun is specifically likely to co-occur in the sentence as a noun which plays a role of each case, for each meaning of a word or usage of a verb. An example of the case frame (example of a verb "take" in English) is illustrated in FIG. 1 (excerpt from page 74 of Non-Patent Literature 2).

The case frame includes a wide range of information regarding the language. Thus, a system has been proposed which generates an utterance for asking back to obtain an argument of a case omitted in a certain utterance (see, for example, Non-Patent Literature 3).

CITATION LIST

Non-Patent Literature

Non-Patent Literature 1: Sadao Kurohashi, "Natural Language Processing", Educational materials of the Open University of Japan 1570153-1-1511
Non-Patent Literature 2: Manabu Okumura, "Foundations of Natural Language Processing", Corona Publishing Co., Ltd., ISBN978-4-339-02451-7
Non-Patent Literature 3: "Generation of candidates for utterance for asking back using case frame with respect to ambiguous user utterance", Tomomasa Furukawa, Koichiro Yoshino, Katsuhisa Sudoh, Satoshi Nakamura, The Association or Natural Language Processing, papers from the 24$^{th}$ Annual Meeting, pp. 905 to 908 (March 2018)

SUMMARY OF THE INVENTION

Technical Problem

The technique described in Non-Patent Literature 3 generates an utterance for asking back, and thus, when a speaker who is asked back does not return an argument of the case, it is impossible to obtain information regarding an argument corresponding to the omitted case.

An object of the present disclosure is to enable acquisition of information regarding an argument corresponding to a case.

Means for Solving the Problem

To achieve the above-described object, the present disclosure uses an argument emergence history database which stores argument emergence patterns associated with cases and arguments of verbs for each meaning of a word or usage of a verb. The present disclosure enables acquisition of information regarding an argument corresponding to a case by using the argument emergence history database.

The argument emergence history database may be stored in an apparatus utilized by a user or may be stored outside the apparatus utilized by the user via a network.

A language processing apparatus according to the present disclosure acquires an output request including a verb to be searched for and an output target case, and a combination of a case and an argument of the verb which are search conditions from a user, refers to an argument emergence history database which stores argument emergence patterns associated with cases and arguments of verbs for each meaning of a word or usage of a verb, acquires an argument emergence pattern which matches the combination of the case and the argument of the verb included in the search conditions from the argument emergence history database, and extracts an argument corresponding to the case of the verb to be searched for from the argument emergence pattern acquired from the argument emergence history database and generates a response to the user using the extracted argument.

A language processing method according to the present disclosure includes acquiring an output request including a verb to be searched for and an output target case, and a combination of a case and an argument of the verb which are search conditions from a user, referring to an argument emergence history database which stores argument emergence patterns associated with cases and arguments of verbs for each meaning of a word or usage of a verb, acquiring an argument emergence pattern which matches the combination of the case and the argument of the verb included in the search conditions from the argument emergence history database, and extracting an argument corresponding to the case of the verb to be searched for from the argument emergence pattern acquired from the argument emergence history database and generating a response to the user using the extracted argument.

A language processing program according to the present disclosure is a program for causing a computer to execute respective steps included in the method according to the present disclosure and is a program for causing a computer to implement respective functional units provided at the apparatus according to the present disclosure.

Effects of the Invention

According to the present disclosure, it is possible to acquire information regarding an argument corresponding to a case.

BRIEF DESCRIPTION OF DRAWINGS

FIG. 6 illustrates an example of a question in the first embodiment.

DESCRIPTION OF EMBODIMENTS

Figure 1:
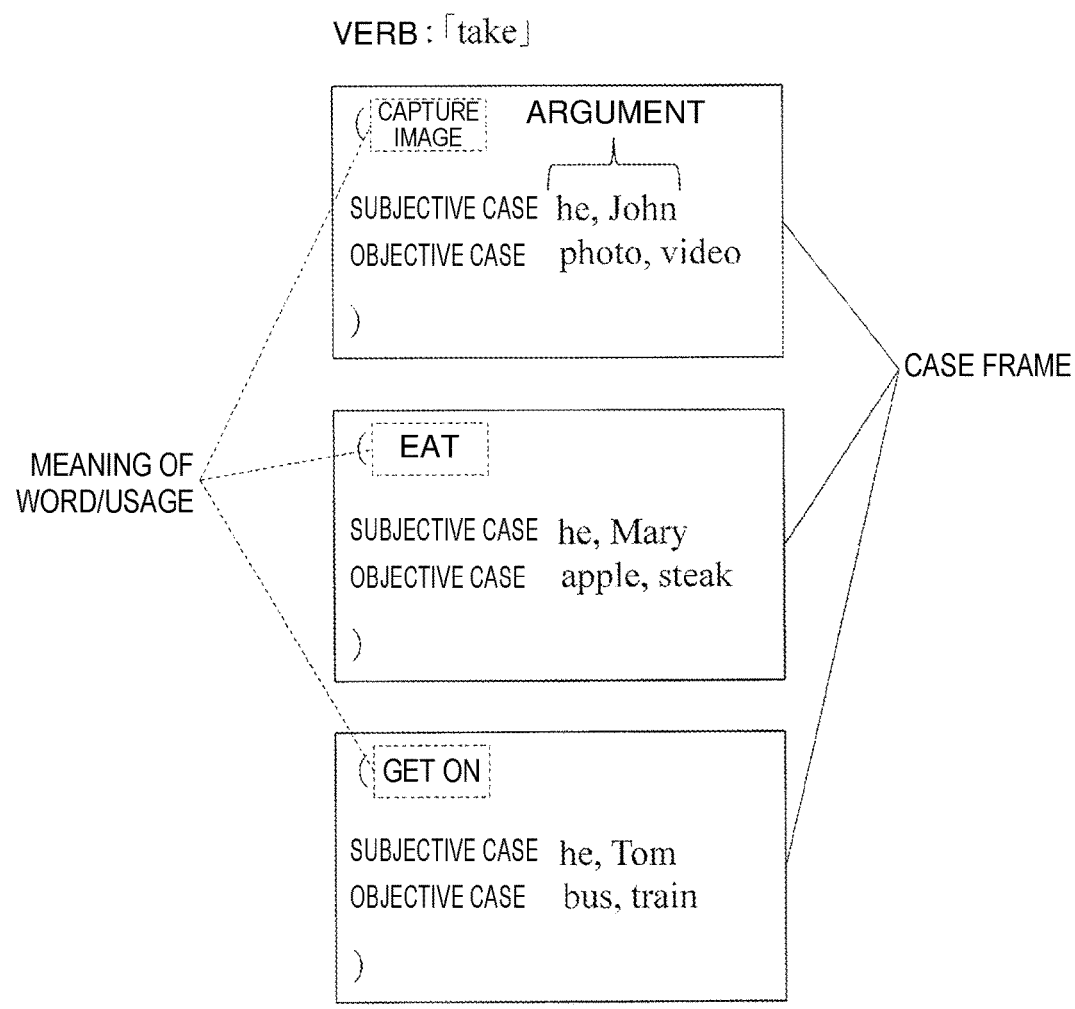
FIG. 1 illustrates an example of a case frame.

Embodiments of the present disclosure will be described in detail below with reference to the drawings. Note that the present disclosure is not limited to the embodiments described below. These embodiments are merely examples, and the present disclosure can be implemented in forms to which various changes and modifications are applied on the basis of knowledge of those skilled in the art. Note that components to which the same reference numerals are assigned in the present specification and the drawings indicate the same components.

Figure 2:
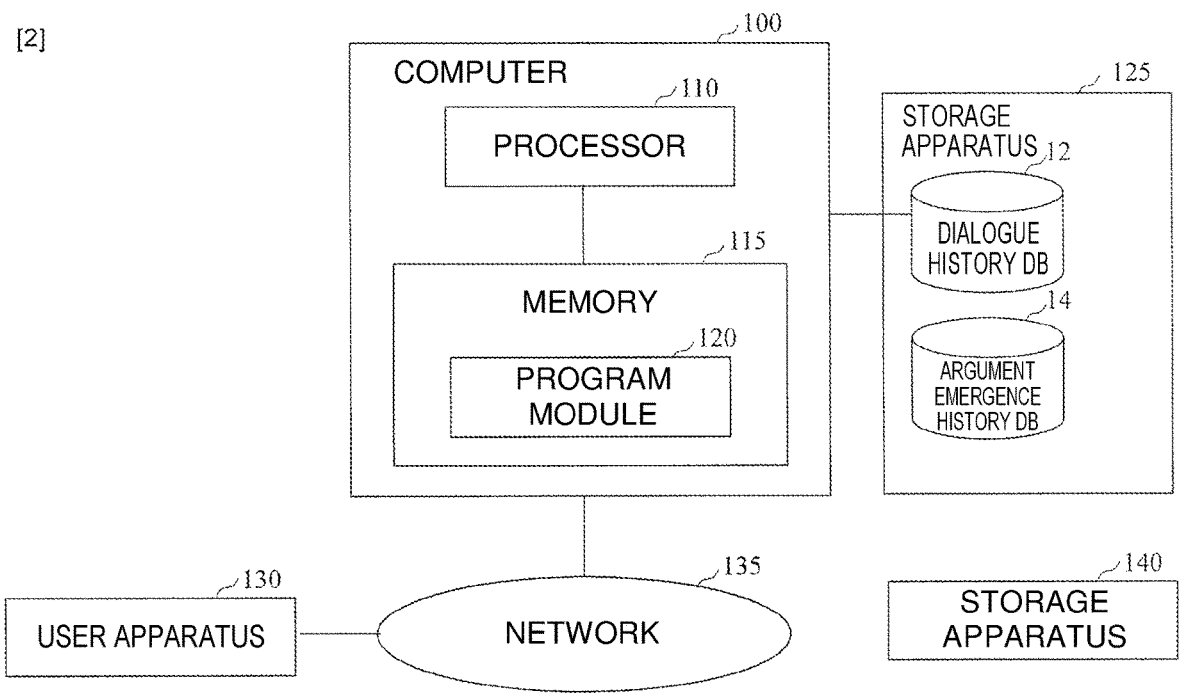
FIG. 2 illustrates an example of a system configuration of the present disclosure.

FIG. 2 illustrates a block diagram of a system of the present disclosure. The system of the present disclosure includes a computer 100 which functions as a language processing apparatus of the present disclosure. The computer 100 may be connected to a network 135.

The network 135 is a data communication network. The network 135 may be a private network or a public network and can include one or all of a personal area network, a local area network, a campus area network, a metropolitan area network, a wide area network or the Internet. Communication is performed using an electronic signal and an optical signal via the network 135.

The computer 100 includes a processor 110, and a memory 115 connected to the processor 110. The processor 110 is an electronic device constituted with a logic circuit which executes a command in response to the command. The memory 115 is a tangible computer readable storage medium in which computer programs are encoded.

The memory 115 stores a program module 120. The program module 120 includes a command for controlling the processor 110 so as to execute processing described in the present specification. While the program module 120 which has already been stored in the memory 115 is described, the program module 120 may be located on a storage apparatus 140 so as to be stored in the memory 115 later. The storage apparatus 140 is a tangible computer readable storage medium which stores the program module 120. The storage apparatus 140 may be a random access memory or other types of electronic storage devices which are located in a remote storage system which is not illustrated and which are connected to the computer 100 via the network 135.

The system according to the present disclosure includes a user device 130 to be connected to the computer 100 via the network 135. The processor 110 outputs an execution result of the program module 120 to the user apparatus 130. The user device 130 can include, for example, an input device such as a keyboard and a speech recognition subsystem which enables a user to convey information and selection of a command to the processor 110. The user apparatus 130 further includes an output device such as a display apparatus, a printer and a speech synthesis apparatus.

(Outline of Present Disclosure)

Figures 3, 4:
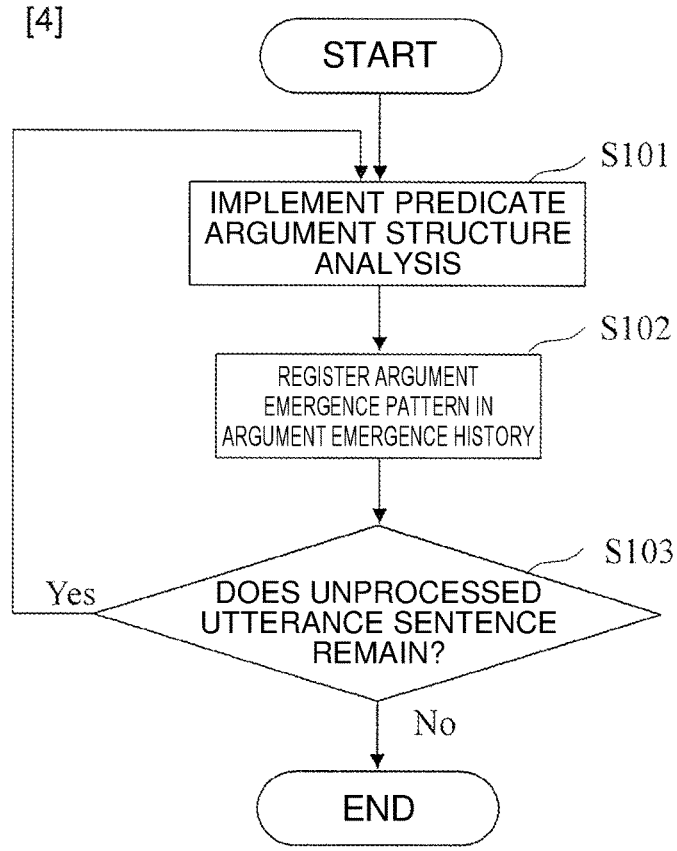
FIG. 3 illustrates an example of argument emergence history.
FIG. 4 is a flowchart illustrating an example of a method for constructing argument emergence history according to the present disclosure.

In the system of the present disclosure, the computer 100 accumulates dialogue history and constructs a database which records a case and an argument corresponding to the case for each meaning of a verb used in the dialogue history. This database will be referred to as argument emergence history. An example of the argument emergence history is illustrated in FIG. 3.

As described in explanation of FIG. 1, typically, one verb has a plurality of meanings of a word and a plurality of kinds of usage (hereinafter, simply referred to as usage) and a case frame is described for each kind of usage of the verb. For example, a verb "take" has usage of "capture an image", "eat" and "get on". Argument emergence patterns associated with cases and arguments of the verb are stored for each kind of this usage.

The system of the present disclosure constructs argument emergence history for each case frame on the basis of a plurality of case frames of a certain one verb. Types and the number of cases of a case frame are typically different for each kind of usage, and here, a total number of types of cases of usage 1 is set as $n_A$. Further, in the present embodiment, to simplify the description, an argument expressing description regarding time and an argument which plays a role as a modifier will be uniformly dealt with as a case.

The case is, for example, a "surface case" which is a case of a noun in grammar. The surface case is a case which can be substantially automatically determined in accordance with a structure of a sentence through syntactic analysis, and is, for example, a subjective case, an objective case and a possessive case.

The case includes a "deep case" in Fillmore's theory of case grammar (see, for example, Table 9-1 on page 108 of Non-Patent Literature 1 and Table 5.1 on page 72 of Non-Patent Literature 2). The deep case indicates a deep semantic role of a word of a verb in a sentence and includes an agent case (Agent), an experiencer case (Experiencer), an instrument case (Instrument), an object case (Object), a source case (Source), a goal case (Goal), a location case (Location) and a time case (Time).

Further, in Japanese, a case includes a ga [particle] case, a wo [particle] case, a ni [particle] case, a de [particle] case and a no [particle] case which are general as a verb in Japanese. Here, the "ga case" corresponds to the "subjective case", and the "wo case" corresponds to the objective case. The case includes cases defined by particles as in Japanese.

Argument emergence patterns in the drawing, that is, respective rows of the argument emergence history indicate a list of specific nouns which play roles of respective cases in each time of emergence when the verb emerges in the usage in dialogue history which records an utterance sentence itself. Ti(j) in the drawing is a case (noun) which plays a role of a case j in an argument emergence pattern i. For example, an agent (subject) of the verb, that is, name of a person, or the like, indicating "who" is put in Ti(1) corresponding to the ga case, and a noun indicating an object of the verb is put in Ti(2) corresponding to the wo case. For example, when a subject of "he" and an object of "photo" are included in a case frame of a verb of "take", an argument T1(1) of a case 1 is "he", and an argument T1(2) of a case 2 is "photo".

Here, the argument emergence pattern is stored in association with a speaker ID which can identify a speaker so as to be able to identify the speaker. The number of times of emergence is counted for each combination of the argument emergence pattern and the speaker ID.

In the present disclosure, this argument emergence history is constructed for each case frame of each verb in processing target language through procedure illustrated in FIG. 4.

(Procedure S101)

Morphological analysis (see, for example, Chapter 3, "Morphological analysis" of Non-Patent Literature 2), syntactic analysis (see, for example, Chapter 4, "Syntactic analysis" of Non-Patent Literature 2), and predicate argument structure analysis (see, for example, Chapter 9, "Analysis of meaning (2)" of Non-Patent Literature 1 and Chapter 5, "Semantic analysis" of Non-Patent Literature 2) are performed on one utterance sentence in dialogue history which records the utterance sentence itself. As a result of the morphological analysis, a "morpheme" which is a minimum linguistic unit having a meaning is specified. The "morpheme" is, for example, a word. As a result of the syntactic analysis, a syntactic structure is specified. As a result of the predicate argument structure analysis, usage of a predicate verb in the utterance sentence and nouns which become arguments corresponding to respective cases are specified.

(Procedure S102)

It is inspected whether or not an argument emergence pattern which corresponds to a list of the arguments specified in procedure S101, that is, an argument emergence pattern in which nouns (arguments) corresponding to all cases are the same as the arguments in the list specified in procedure S101 and which have a speaker ID indicating a speaker of the utterance sentence, exists among the argument emergence history of the usage of the verb. When such an argument emergence pattern exists, a number in a field of the number of times of emergence is incremented by one. It is assumed here that an initial value of the number in the field of the number of times of emergence is 0. When such an argument emergence pattern does not exist, a pair of the list of arguments specified in procedure S101 and the speaker ID indicating the speaker of the utterance sentence is newly registered in the argument emergence history of the usage as a new argument emergence pattern. At this time, 1 is set at the number in the corresponding field of the number of times of emergence.

(Procedure S103)

When an unprocessed utterance sentence remains in the dialogue history, the processing returns to procedure S101 while the next utterance sentence is set as an utterance sentence to be processed. When an unprocessed utterance sentence does not remain in the dialogue history, the processing is finished.

(Effects of Present Disclosure)

The system of the present disclosure includes means for executing respective kinds of procedure, creates history regarding nouns which become arguments of cases of a verb which has been used in the past dialogue and accumulates the history in the argument emergence history database. The present disclosure therefore enables decision making and confirmation of the past information with reference to the argument emergence history database even when a person who is asked back about an argument of a certain case does not have clear intention of specifying the argument of the case or does not remember the case. Further, in a situation where a person cannot ask back, the person who desires to acquire information regarding the argument of the case can confirm information regarding the argument of a desired case with reference to the argument emergence history database.

First Embodiment

Figure 5:
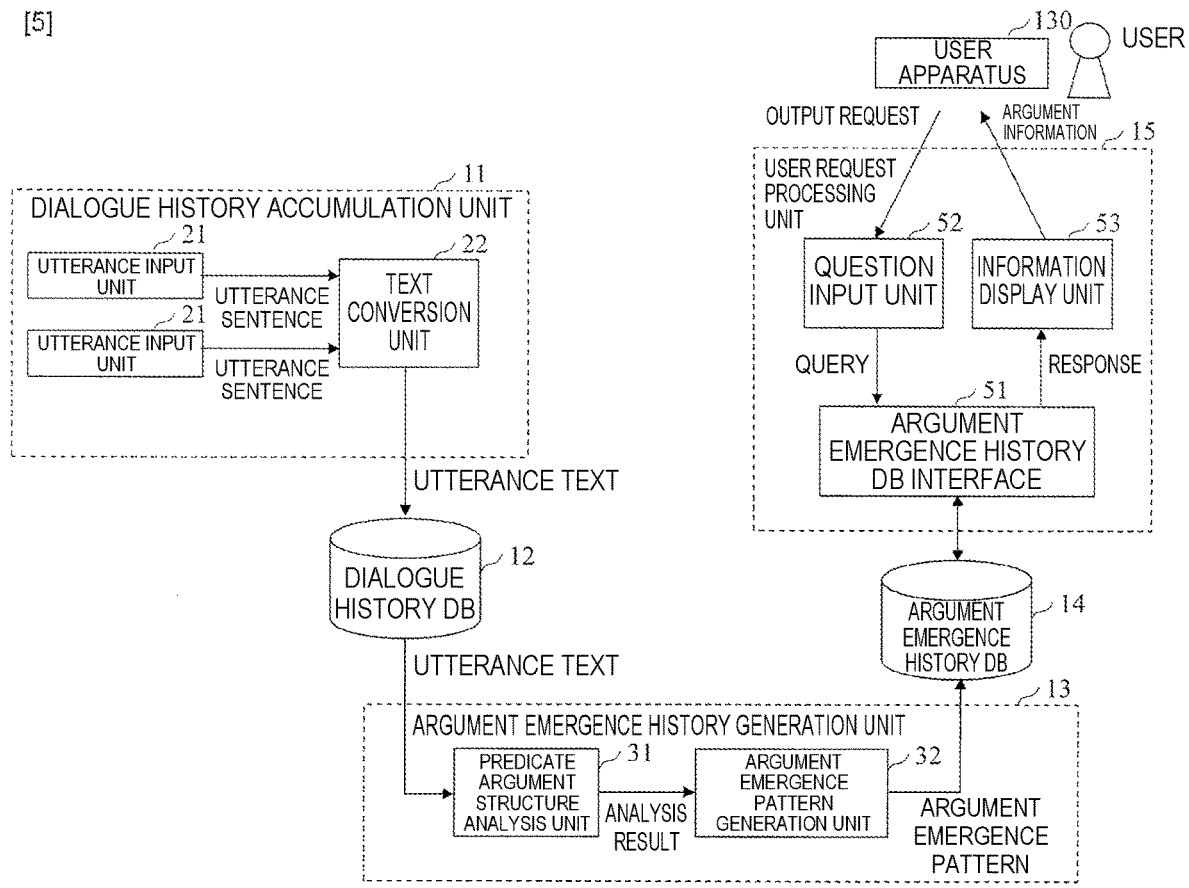
FIG. 5 illustrates a first embodiment for implementing the present disclosure.

FIG. 5 is a block diagram illustrating an example of the present embodiment. In the present embodiment, the computer 100 which includes an argument emergence history DB (database) 14 and a user request processing unit 15, returns to a user, information regarding the argument corresponding to the case of the verb in response to an output request from the user with reference to the argument emergence history DB 14. The argument emergence history DB 14 is stored in a storage apparatus 125 connected to the processor 110. In the present embodiment, to construct the argument emergence history DB 14, the computer 100 includes a dialogue history accumulation unit 11 which executes dialogue history accumulation processing, a dialogue history DB 12, and an argument emergence history generation unit 13 which executes argument emergence history generation processing.

The dialogue history accumulation unit 11 accumulates history of an utterance sentence itself uttered during a dialogue. The argument emergence history generation unit 13 extracts an utterance sentence from the dialogue history DB 12 and generates an argument emergence pattern using the utterance sentence. The generated argument emergence pattern is stored in the argument emergence history DB 14. The user request processing unit 15 acquires information regarding an argument of a case of a verb used in the dialogue history by utilizing the argument emergence pattern stored in this argument emergence history DB 14.

Three kinds of processing of dialogue history accumulation processing, argument emergence history generation processing and user request processing are respectively independently executed in parallel. For example, the user request processing utilizes the argument emergence history. Thus, the dialogue history accumulation processing and the argument emergence history generation processing are performed in advance before the user request processing. In this manner, in the present embodiment, information regarding an argument of a desired case is searched for using the past argument emergence history. Here, the dialogue used in the past argument emergence history includes an utterance of an arbitrary user including a user who can perform input to the user request processing unit 15.

(Dialogue History Accumulation Processing)

The dialogue history accumulation unit 11 executes the dialogue history accumulation processing and accumulates an utterance sentence in the dialogue history DB 12. The dialogue history DB 12 is stored in a storage apparatus 125 connected to the processor 110.

The dialogue history accumulation unit 11 includes an utterance input unit 21 which acquires an utterance sentence. In a dialogue using speech, the utterance input unit 21 is an arbitrary apparatus which inputs utterance speech to the computer 100 via a microphone, or the like. In a text-based dialogue, the utterance input unit 21 is an arbitrary apparatus which inputs utterance text input as text by a speaker to the computer 100. The utterance input unit 21 is prepared for each speaker who participates in a dialogue. Here, any method can be used as a method for specifying a speaker, and the utterance input unit 21 does not necessarily have to be prepared for each speaker.

In a dialogue using speech, the dialogue history accumulation unit 11 includes a text conversion unit 22. The text conversion unit 22 is an arbitrary apparatus which converts speech data input via the utterance input unit 21 into text data using an existing speech recognition technique. In a text-based dialogue, the text conversion unit 22 performs no operation. The text conversion unit 22 performs processing of collectively converting utterance sentences transmitted from respective utterance input units 21 into text data and accumulates the converted utterance text in the dialogue history DB 12.

(Argument Emergence History Generation Processing)

The argument emergence history generation unit 13 executes argument emergence history generation processing on the utterance sentences accumulated in the dialogue history DB 12 and stores argument emergence patterns in the argument emergence history DB 14.

The predicate argument structure analysis unit 31 extracts utterance text within the dialogue history DB 12 and performs processing of procedure S101 and procedure S103 on the utterance text. The existing technique described in procedure S101 can be used in morphological analysis, syntactic analysis and predicate argument structure analysis. The argument emergence pattern generation unit 32 performs processing of procedure S102.

(User Request Processing)

The user request processing unit 15 executes user request processing using the argument emergence pattern stored in the argument emergence history DB 14. A user of the system of the present embodiment does not have a dialogue with others during use of the present system and implements processing of searching for information regarding a desired case using the past argument emergence history DB 14.

A question input unit 52 is means for inputting an output request from the user. The output request from the user is means for inputting a question including a search target and search conditions so that the user can obtain desired information. A question regarding argument information of the case includes a verb to be searched for, designation of conditions of a case which designates a combination of a case of the verb and a value of an argument of the case which are search conditions, designation of a speaker which is also a search condition, and an output target case which designates a case for which a value of an argument is desired to be obtained.

An argument emergence history DB interface 51 performs processing of converting the output request which is input to the question input unit 52 from the user into a search command (query) which supports a database form of the argument emergence history DB 14 and inputting the query to the argument emergence history DB 14 and processing of passing a response to the query from the argument emergence history DB 14 to an information display unit 53. For example, when the argument emergence history DB 14 is constituted in a typical structured query language (SQL) form, the argument emergence history DB interface 51 implements a function of dealing with a query/response in a SQL form with respect to this DB.

The information display unit 53 converts the response from the argument emergence history DB 14 into a form which can be read by the user apparatus 130 and displays the response at the user apparatus 130.

Figure 7:
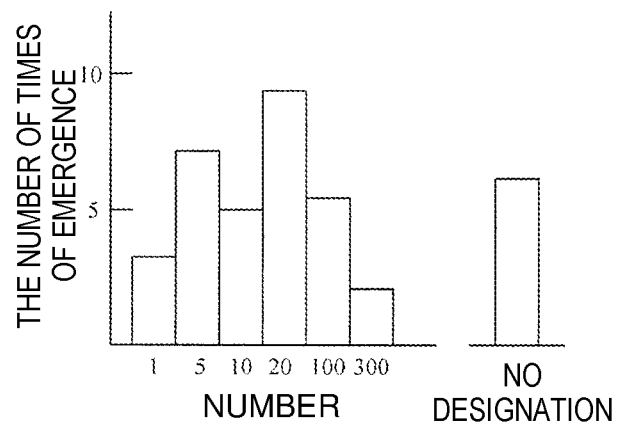
FIG. 7 illustrates an example of a response in the first embodiment.

FIG. 6 and FIG. 7 illustrates a specific example of the processing of the user request processing unit 15. The present example is an example where the user examines tendency of the number of ordered notebooks on the basis of the past argument emergence history using the system of the present embodiment.

FIG. 6 illustrates an example of input to the question input unit 52 by the user. When the user desires to examine order of notebooks, the question input unit 52 designates search conditions and a search target. The question input unit 52 designates "order" as a verb to be searched for and designates the "wo case" and "notebook" as the search conditions. The question input unit 52 then designates a "modifier expressing quantity" which is one of cases of the verb of "order" as an output target case for which argument information is desired to be obtained. Note that a speaker is not designated in the example in FIG. 6.

Here, the cases of the verb differs depending on verbs. Thus, in when the verb is designated by the user, the question input unit 52 preferably displays a list of cases associated with the verb designated by the user. By this means, the question input unit 52 can designate one or more arbitrary output target cases.

Further, the question input unit 52 may be able to designate a speaker. When a specific speaker ID is designated in a field for designating a speaker, the question input unit 52 sets only argument emergence patterns of the speaker designated with the "speaker ID" among the argument emergence history in FIG. 3 as search targets. When the speaker ID is not designated, argument emergence patterns of utterances of all speakers are set as search targets.

The argument emergence history DB interface 51 converts this question into a query to the argument emergence history DB 14 and inputs the query to the argument emergence history DB 14. The emergence history DB 14 extracts argument emergence patterns which have the same verb, argument of a case and speaker ID as those included in the query from the question input unit 52 and returns the argument emergence patterns to the argument emergence history DB interface 51. For example, the argument emergence history DB 14 extracts all argument emergence patterns in all kinds of usage of a verb "order", for which an argument of the wo case is a noun of "notebook". The argument emergence history DB interface 51 then outputs the arguments of the case of "modifier expressing quantity" included in the extracted argument emergence patterns to the information display unit 53. By this means, the information display unit 53 can display the arguments corresponding to the output target case input to the question input unit 52 at the user apparatus 130.

The response to the query is, for example, processed as illustrated in FIG. 7 and displayed by the information display unit 53. In this example, pairs of types of arguments of emerging nouns and the number of times of emergence thereof are output as a search result. The number of times of emergence is displayed as histogram of the number of ordered notebooks. In other words, for example, when an argument of a case of the "modifier expressing quantity" of a certain argument emergence pattern is a numerical value of 10, and a numerical value in a field of the number of times of emergence is 5, this instance is interpreted as the number of times of emergence of stating that 10 notebooks are ordered, which corresponds to the argument emergence pattern, being five times.

The past tendency regarding order of notebooks by the user can be seen from this histogram.

While the information display unit 53 performs tallying in view of a numerical value in a field of the number of times of emergence of the argument emergence pattern in display of the result of the output target case in this manner, an arbitrary method may be used as a tallying method. For example, arbitrary processing such as processing of arranging arguments in the list in order of the number of times of emergence, and processing of displaying a calculation result such as a maximum value, a minimum value and an average value when the argument is a numerical value, may be performed.

In the examples in FIG. 6 and FIG. 7, a speaker is not designated, and thus, the information display unit 53 does not distinguish information regarding the number of notebooks for each speaker. When a speaker is designated at the question input unit 52, the information display unit 53 displays the graph illustrated in FIG. 7 for each speaker.

While FIG. 6 and FIG. 7 illustrate an example of using search conditions that the "wo case" is "notebook", and the output target case for which argument information is desired to be obtained is "modifier expressing quantity", the present disclosure can be applied to arbitrary search conditions and information regarding an arbitrary case which is desired to be obtained.

For example, when the "de case" is designated as the output target case for which argument information is desired to be obtained in the example in FIG. 6, arguments of the "de case" such as on the net, at a shop, at the website, on the Internet, and at shop xx are displayed in place of the "number of notebooks" in FIG. 7. Further, when the "no case" is designated as the output target case for which argument information is desired to be obtained in the example in FIG. 6, arguments of the "no case" such as of a loose leaf, of company xxx, of A4 size, and of recycled paper are displayed in place of the "number of notebooks" in FIG. 7.

Note that while in the present embodiment, an example has been described where all argument emergence patterns included in all kinds of usage for one verb input to the question input unit 52 are extracted, the present disclosure is not limited to this. For example, when the designated verb has a plurality of kinds of usage, the question input unit 52 may display a list of usage associated with the verb to be searched for. In this instance, the question input unit 52 designates one or more arbitrary number of kinds of usage to be searched for which are designated from the user from the displayed usage, as the verb.

Further, while in the present embodiment, an example has been described where the user inputs a verb, search conditions of the case and an output request to the question input unit 52, the present disclosure is not limited to this. For example, when the question input unit 52 receives input of the "number of ordered notebooks", the question input unit 52 may perform processing similar to that of the predicate argument structure analysis unit 31, may specify that the verb is "order" from this input, may specify that the "wo case" is "notebook", and may specify that the output target case of the verb to be searched for relates to the number. In this manner, the question input unit 52 of the present disclosure can employ an arbitrary interface.

In this manner, the present embodiment can designate tallying and output in any form depending on design of the interface of the question input unit 52. Further, the present embodiment can employ arbitrary design for a method for designating types and the number of output target cases and a method for displaying an output result.

Second Embodiment

Figure 8:
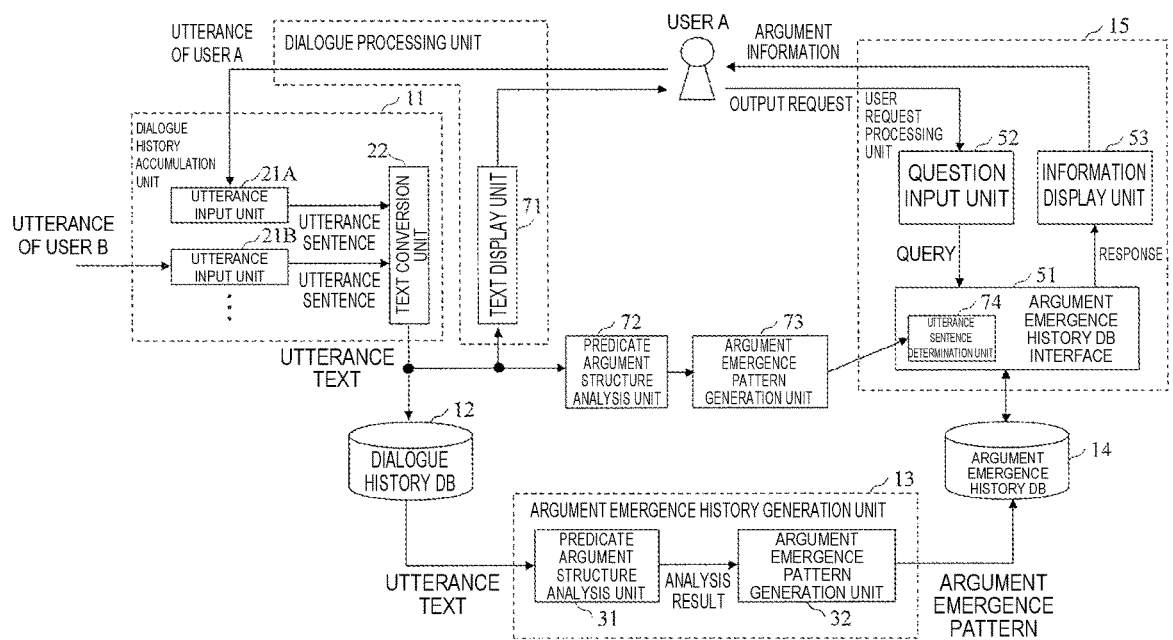
FIG. 8 illustrates a second embodiment for implementing the present disclosure.

FIG. 8 is a block diagram illustrating an example of the present embodiment. The present embodiment further includes a text display unit 71, a predicate argument structure analysis unit 72, an argument emergence pattern generation unit 73 and an utterance sentence determination unit 74.

The text conversion unit 22 converts utterance sentences of all participants of a dialogue into text data. The text display unit 71 displays utterance text of all the participants of the dialogue to all the participants of the dialogue. By this means, all the participants of the dialogue can browse utterances of all speakers.

Further, in the present embodiment, all the participants of the dialogue can utilize the question input unit 52 and the information display unit 53. This configuration enables all the participants of the dialogue to utilize argument emergence history in view of content and a situation of a dialogue in progress which the participants are currently taking part in. These points are different from the first embodiment.

Output of the text conversion unit 22, that is, utterance text obtained by converting utterance sentences of a dialogue in progress is transmitted to the dialogue history DB 12 and the text display unit 71 and is also transmitted to an utterance sentence determination unit 74 inside the argument emergence history interface 51 via the predicate argument structure analysis unit 72 and the argument emergence pattern generation unit 73.

The predicate argument structure analysis unit 72 and the argument emergence pattern generation unit 73 perform processing similar to that of the argument emergence history generation unit 13. The utterance sentence determination unit 74 can therefore acquire an argument emergence pattern of an utterance currently in progress.

The utterance sentence determination unit 74 executes determination processing determined in advance on the utterance currently in progress with reference to the input argument emergence pattern and the argument emergence patterns accumulated in the argument emergence history DB 14. Arbitrary content can be designated as the processing content. The utterance sentence determination unit 74 then passes the determination result to the information display unit 53 when it is necessary to display the result. By this means, the user who participates in the dialogue can automatically instantaneously acquire necessary information relating to the dialogue currently in progress and suggestion regarding content to be stated next. Other points are the same as those in the first embodiment.

Figure 9:
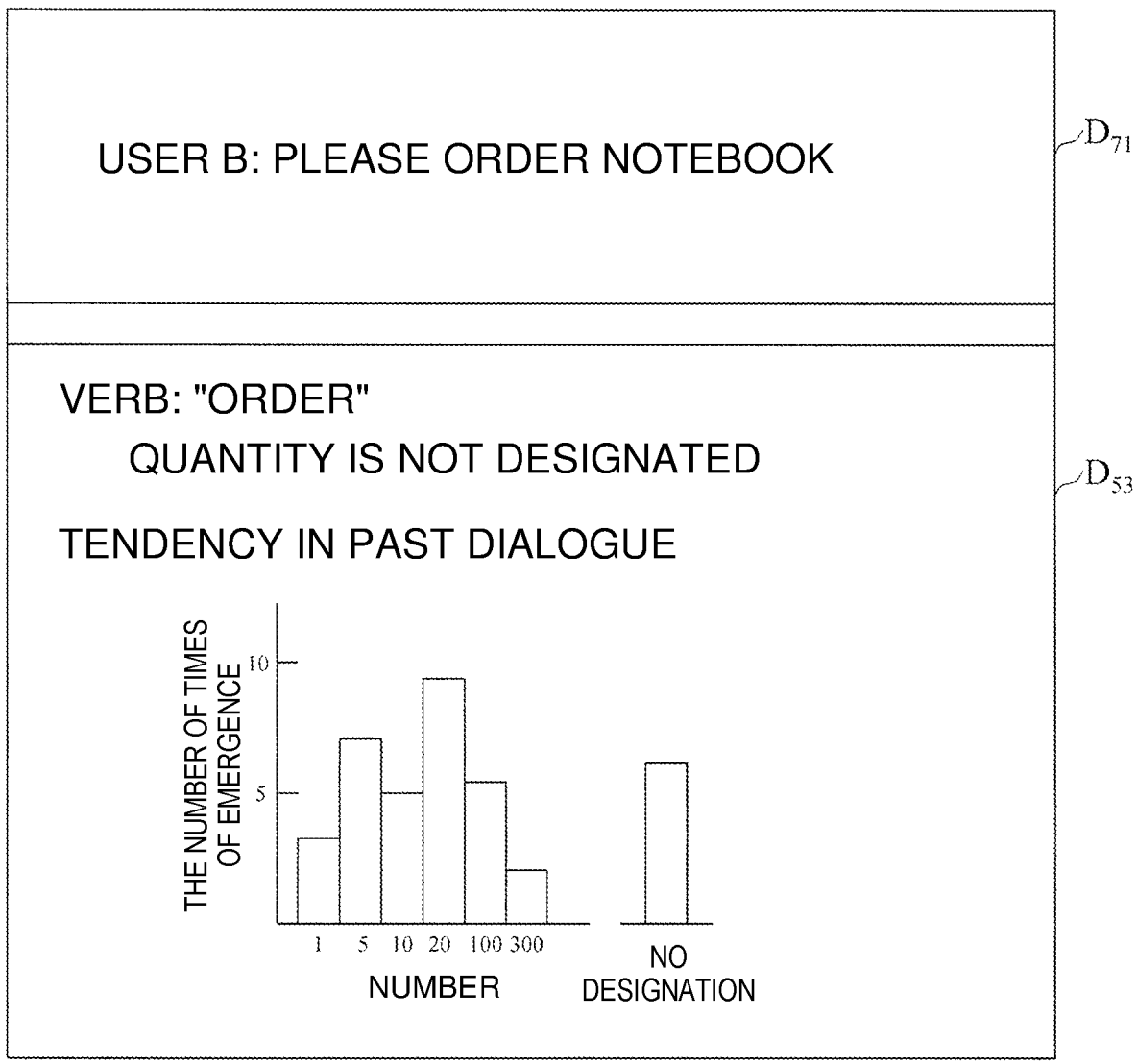
FIG. 9 illustrates an example of output by an utterance sentence determination unit.

FIG. 9 illustrates an example of processing to be executed by the utterance sentence determination unit 74. In this example, the utterance sentence determination unit 74 determines whether or not a case which has a high probability that a noun corresponding to an argument is explicitly designated (uttered) in an utterance in the argument emergence history database 14, is expressly designated among the argument emergence pattern generated at the argument emergence pattern generation unit 73. When it is detected that the case is not designated, the utterance sentence determination unit 74 presents an alarm indicating that the case is not designated and the past history regarding the argument of the case.

In the example in FIG. 9, the utterance sentence determination unit 74 extracts a verb of "order" from an utterance sentence of "please order a notebook" uttered by a user B who is a participant of a dialogue. The utterance sentence determination unit 74 then specifies past argument emergence patterns in which an argument corresponding to the wo case is a noun of "notebook" from the argument emergence history database 14. The utterance sentence determination unit 74 then detects that a probability that an argument corresponding to the output target case of "modifier regarding quantity" is explicitly designated is higher than a reference threshold, and that the argument is not clearly specified in the dialogue in progress. Then, the utterance sentence determination unit 74 displays an alarm indicating that and displays tendency in the argument emergence history of the value.

For example, the information display unit 53 displays information indicating that the user B states the utterance sentence of "please order a notebook" at an utterance sentence display unit $D_{71}$ at the user apparatus 130. Further, the information display unit 53 displays a verb of "order" which is a target of the alarm and a message of "quantity is not designated" corresponding to the case which is a target of the alarm at a comment display unit $D_{53}$ at the user apparatus 130.

The information display unit 53 may provide display at the utterance sentence display unit $D_{71}$ and the comment display unit $D_{53}$ to user apparatuses 130 of all participants of the dialogue or may provide display only at the user apparatus 130 of the user B. While in the present embodiment, argument emergence patterns corresponding to the speaker are acquired, argument emergence patterns which do not specify a speaker may be acquired.

The apparatus of the present disclosure can also be implemented with a computer and a program, and the program can also be recorded in a recording medium or can also be provided through a network.

INDUSTRIAL APPLICABILITY

The present disclosure can be applied to information communication industries.

REFERENCE SIGNS LIST

11 Dialogue history accumulation unit
12 Dialogue history database
21 Utterance input unit
22 Text conversion unit
13 Argument emergence history generation unit
31, 72 Predicate argument structure analysis unit
32, 73 Argument emergence pattern generation unit
14 Argument emergence history database
15 User request processing unit
51 Argument emergence history DB interface
52 Question input unit
53 Information display unit
71 Text display unit
74 Utterance sentence determination unit
100 Computer
110 Processor
115 Memory
120 Program module
125, 140 Storage apparatus
130 User apparatus
135 Network

The invention claimed is:

1. A language processing apparatus, comprising:
a processor; and
a storage medium having computer program instructions stored thereon, when executed by the processor, perform to:
acquires an output request including a verb to be searched for and an output target case, and a combination of a case and an argument of the verb which are search conditions from a user,
refers to an argument emergence history database which stores argument emergence patterns associated with cases and arguments of verbs for each meaning of a word or usage of a verb,
acquires an argument emergence pattern which matches the combination of the case and the argument of the verb included in the search conditions from the argument emergence history database, and
extracts an argument corresponding to the output target case from the argument emergence pattern acquired from the argument emergence history database and generates a response to the user using the extracted argument.

2. The language processing apparatus according to claim 1,
wherein in the argument emergence patterns, identification information of speakers is further associated with the cases and the arguments of the verbs,
an utterance sentence is acquired from a dialogue history database which accumulates text data of utterance sentences included in a dialogue for each speaker,
a verb included in the utterance sentence and a meaning of a word or usage of the verb are extracted, a noun used as a case of the verb is specified from nouns included in the utterance sentence, and an argument emergence pattern associated with a case and an argument of the verb, and identification information of a speaker is created and stored in the argument emergence history database in accordance with the meaning of a word or the usage of the verb.

3. The language processing apparatus according to claim 2,
wherein the argument emergence history database further stores a number of times of emergence of an argument emergence pattern,
when an argument emergence pattern included in an utterance sentence has already been stored in the argument emergence history database, a number of times of emergence of the argument emergence pattern stored in the argument emergence history database is incremented, and
a response to the user is generated using the number of times of emergence of the argument emergence pattern.

4. The language processing apparatus according to claim 2,
wherein a dialogue of a plurality of users including the user is input,
a verb included in an utterance sentence included in the dialogue of the plurality of users is extracted,
a noun used as a case of the verb is specified from nouns included in the utterance sentence,
an argument emergence pattern corresponding to a combination of the verb included in the utterance sentence and the noun used as the case of the verb is acquired from the argument emergence history database, and
processing determined in advance is executed using the argument emergence pattern acquired from the argument emergence history database and a processing result is presented to at least one of the plurality of users.

5. The language processing apparatus according to claim 4,
wherein an argument emergence pattern to be acquired from the argument emergence history database is an argument emergence pattern which corresponds to identification information of a speaker as well as the combination of the verb included in the utterance sentence and the noun used as the case of the verb.

6. A language processing method, comprising:
acquiring an output request including a verb to be searched for and an output target case, and a combination of a case and an argument of the verb which are search conditions from a user,
referring to an argument emergence history database which stores argument emergence patterns associated with cases and arguments of verbs for each meaning of a word or usage of a verb,
acquiring an argument emergence pattern which matches the combination of the case and the argument of the verb included in the search conditions from the argument emergence history database, and
extracting an argument corresponding to the output target case from the argument emergence pattern acquired from the argument emergence history database and generating a response to the user using the extracted argument.

7. A non-transitory computer-readable medium having computer-executable instructions that, upon execution of the instructions by a processor of a computer, cause the computer to function as language processing apparatus according to claim 1.

* * * * *